US008595615B2

(12) United States Patent  (10) Patent No.: US 8,595,615 B2
Lau et al.  (45) Date of Patent: Nov. 26, 2013

(54) SYSTEM AND METHOD FOR AUTOMATIC STYLESHEET INFERENCE

(75) Inventors: Tessa Lau, Mountain View, CA (US);
John J. Turek, South Nyack, NY (US);
Hui Su, Beijing (CN); Tian Shu Wang, Shangdi (CN)

(73) Assignee: International Business Machines Corporation, Armonk, NY (US)

( * ) Notice: Subject to any disclaimer, the term of this patent is extended or adjusted under 35 U.S.C. 154(b) by 1322 days.

(21) Appl. No.: 11/672,166

(22) Filed: Feb. 7, 2007

(65) Prior Publication Data
US 2008/0189600 A1   Aug. 7, 2008

(51) Int. Cl.
*G06F 17/21* (2006.01)
(52) U.S. Cl.
USPC .......... 715/249; 715/235; 715/243; 715/248; 715/269
(58) Field of Classification Search
USPC ......................... 715/235, 243, 248, 249, 269
See application file for complete search history.

(56) References Cited

U.S. PATENT DOCUMENTS

| 4,254,468 | A  | * | 3/1981  | Craig ............................ 345/469 |
| 4,850,026 | A  | * | 7/1989  | Jeng et al. ..................... 382/185 |
| 5,784,487 | A  | * | 7/1998  | Cooperman ................... 382/175 |
| 5,860,073 | A  | * | 1/1999  | Ferrel et al. ................... 715/255 |
| 6,088,711 | A  | * | 7/2000  | Fein et al. ..................... 715/269 |
| 6,269,188 | B1 | * | 7/2001  | Jamali ........................... 382/229 |
| 6,496,600 | B1 | * | 12/2002 | Huang ........................... 382/187 |
| 6,622,239 | B1 | * | 9/2003  | Wong et al. ................... 712/227 |
| 6,668,354 | B1 |   | 12/2003 | Chen |
| 6,741,745 | B2 | * | 5/2004  | Dance et al. .................. 382/229 |
| 6,892,348 | B1 | * | 5/2005  | Truelove et al. .............. 715/255 |
| 7,602,396 | B2 | * | 10/2009 | Asente et al. ................. 345/581 |
| 2001/0044809 | A1 |   | 11/2001 | Parasniis |
| 2002/0010717 | A1 | * | 1/2002  | Breuer et al. ................. 707/517 |
| 2002/0181779 | A1 | * | 12/2002 | Hansen ......................... 382/209 |
| 2003/0084405 | A1 |   | 5/2003  | Ito |
| 2003/0233620 | A1 | * | 12/2003 | Vedullapalli et al. ......... 715/522 |
| 2004/0148577 | A1 | * | 7/2004  | Xu et al. ....................... 715/530 |
| 2004/0205588 | A1 |   | 10/2004 | Purvis |

(Continued)

OTHER PUBLICATIONS

Elizabeth Castro; HTML 4 for the World Wide Web: Visual QuickStart Guide; Oct. 20, 1999; Peachpit Press; pp. 37, 39.*
Eric Meyer; Cascading Style Sheets: The Definitive Guide; May 1, 2000; O'Reilly Media, Inc.; pp. 3-5.*

(Continued)

*Primary Examiner* — Doug Hutton, Jr.
*Assistant Examiner* — Andrew Dyer
(74) *Attorney, Agent, or Firm* — August Law, LLC; George Willinghan

(57) ABSTRACT

A method is provided for automatically applying named styles to existing documents including word processing documents. The existing document is scanned and parsed into style regions of uniform style. The style attributes of each uniform style region are identified, and these identified style attributes are used to create style groups containing style regions having identical or substantially identical style attributes. These style attributes can be expressed in set or vector form. Named styles are then associated with the identified style group by either comparing the style attributes of a given style group to the attributes of a pre-defined named style or by extracting a named style from the style group. Once associated with a named style, the style regions within a given style group can be modified to be consistent with the named style associated with the style group. In addition, subsequent changes to the style attributes in a given style region are made by changing the attributes of the named style associated with the style group containing that style region.

17 Claims, 2 Drawing Sheets

(56) References Cited

U.S. PATENT DOCUMENTS

| | | |
|---|---|---|
| 2005/0034066 A1 | 2/2005 | Ahlert |
| 2006/0107203 A1* | 5/2006 | Schilling et al. .............. 715/517 |
| 2006/0155700 A1* | 7/2006 | Dejean et al. ...................... 707/6 |
| 2006/0200755 A1* | 9/2006 | Melmon et al. ............... 715/511 |
| 2006/0236237 A1* | 10/2006 | Peiro et al. .................... 715/530 |
| 2006/0251339 A1* | 11/2006 | Gokturk et al. ............... 382/305 |
| 2007/0159646 A1* | 7/2007 | Adelberg et al. ............ 358/1.11 |
| 2007/0220424 A1* | 9/2007 | Shaw et al. ................... 715/529 |

OTHER PUBLICATIONS

MacQueen J., "Some Methods for Classification and Analysis of Multivariate Observations" in Proceedings of the 5th Berkley Symposium on Mathematical Statistics and Probability, Jun. 21-Jul. 1965 and Dec. 27, 1965-Jan. 7, 1966, vol. 1, pp. 281-297, University of California Press (1967).

Johnson, S.C., "Hierarchical Clustering Schemes", Psychometrika, vol. 32, No. 3, Sep. 1967, pp. 241-254.

Anonymous, "Automatic Converson of documents Styles", Research Disclosure, Aug. 1988, No. 292 (29241), Kenneth Mason Publications, LTD, England, DA887-0011, p. A-21.

* cited by examiner

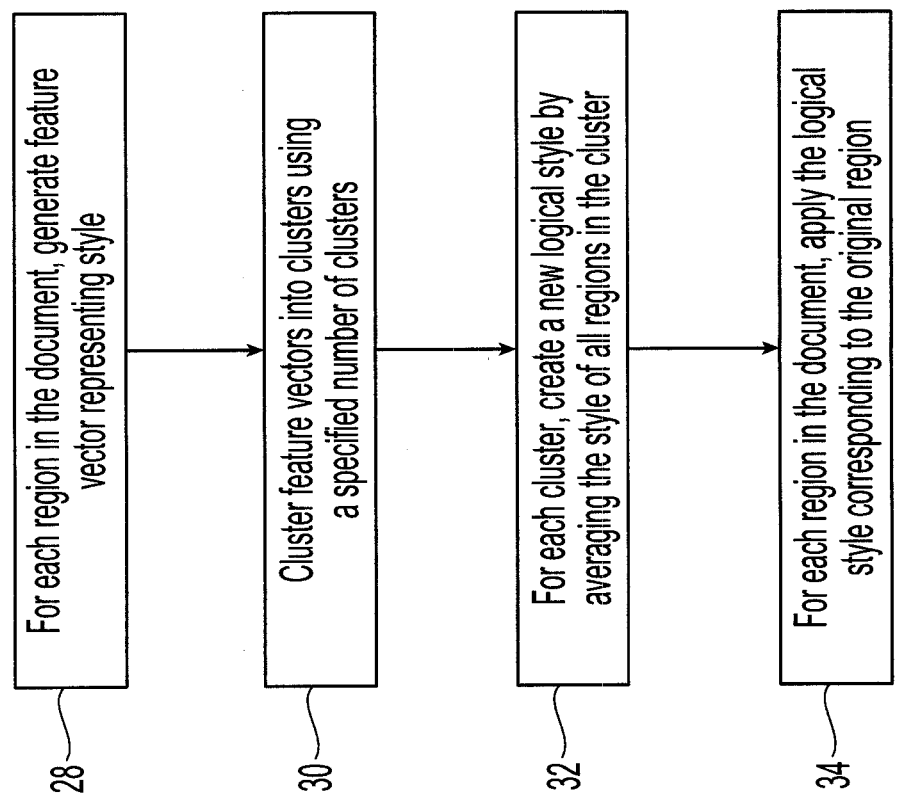

SYSTEM AND METHOD FOR AUTOMATIC STYLESHEET INFERENCE

FIELD OF THE INVENTION

The present invention relates to word processing programs and in particular to style sheets used in word processing programs.

BACKGROUND OF THE INVENTION

Documents created using current word processors, e.g., Microsoft© Word©, which is commercially available from the Microsoft Corporation of Redmond, Wash., or OpenOffice, which is an opensource product available at www.opensource.org, often contain a variety of styles within a single document. In general, a style is a set of attributes that characterize how characters in a document should be formatted. The word processors utilize two main approaches to manage these various styles within a single document. The first approach is to use named styles. A named style is a set of attributes collected together such that all the attributes can be applied to the characters of a selected region at the same time with a single gesture. In addition, the set of attributes typically has an abstract name, for example "Heading", that refers to the purpose of the style sheet rather than the visual characteristics of the style. With the named styles approach, a user can select a region of text and apply a named style, e.g., "Heading" or "Body text" to all text located within that region. The style defines the characteristics of the text including the font and other attributes. For example, the style "Heading" can be defined as Helvetica 24 point bold or Times 10 point regular. Changes to a given named style affect the text in all regions within a document that have been assigned to that style, and a given word processing program provides the necessary interfaces to change the style attributes of each named style. The use of named styles provides the benefit of using a single action to effect changes consistently across the entire document.

The second approach to styling a document is to use direct or manual manipulation to create adhoc styles. In this approach, a user selects a region of text and manually sets the style of the text within the selected region using the affordances provided by the word processor to choose the font face, size, obliqueness and other factors. Most users are familiar with the direct manipulation approach and, therefore, are most likely to use this approach to implement the desired styles within a given document. However, the direct manipulation approach has the drawback that users wishing to make a consistent change must repetitively select each region of the document and apply the desired style separately to each selected region. This practice is laborious, time-consuming and error-prone and results in a variety of adhoc styles being applied across the document. The use of adhoc styles makes it difficult to keep styles consistent across a document. For instance, if the user wants to make all headings bold 16-pt Arial text, the user must laboriously search through the document, locate each instance of the desired heading, and manually apply the desired style. If the user had employed named styles, the same modification could have been made by making a single change to the named style.

Although named styles make style formatting easier and more consistent, they present a level of abstraction that many users find difficult to master, because named styles are one level removed from the familiar direct-manipulation user interface. Therefore, named styles can be difficult to use, and very few users are capable of using them effectively. The use of named styles also presents issues during cut and paste and document merging. For example, merging multiple documents from different sources introduces style inconsistencies into a single merged document. Each merged document can have a different set of named styles. For example, the style for the majority of plain text in a document might be named "Body Text" style in one document and "Plain Text" style in another document. Furthermore, those two styles might have different characteristics, for example a different font size.

The deficiencies in both the named style and the adhoc style approach result in documents that have inconsistent styles. Because of these inconsistencies, documents may not have a uniform appearance, and the document becomes difficult to modify as changes made in one section of the document must be manually repeated for the remaining sections.

SUMMARY OF THE INVENTION

Systems and methods in accordance with exemplary embodiments of the present invention provide for the styling of text, for example setting font size, font style and other features, in a word processing program such as Microsoft© Word© or OpenOffice, in a presentation program such as Microsoft© Powerpoint©, which is commercially available from the Microsoft Corporation of Redmond, Wash., or in any type of document editor that allows users to edit formatted test with a multitude of styles. A given document is scanned and partitioned into style regions having identical styles.

In one embodiment, a similarity-based match such as automated clustering is used to group together similar style regions to form logical style groups. Therefore, two regions that are similar in style can be identified and placed into the same style group. For example, one region can be using a 17 point font and the other region can be using an 18 point font for a heading. Similarity matching can be based on the features of the style, for example point size, or on similar contents of the text, for example "Section 1: Introduction" and "Section 2: Motivation".

In one embodiment, each logical style group is mapped to one of the existing named styles in the document, and all style regions in the style group are converted to instances of the named style. Thus the text of a given document is converted from multiple, visually-similar but distinct styles that had been directly-applied or merged into the document into a smaller number of named styles. The system for automatic style inference examines the styles present in a document, detects regions where the styles are similar or identical and automatically converts from the manually-applied styles to a single, consistent, named style for those regions. Using this invention, the system could provide a "style cleanup" feature that identifies all instances of the "bold, 15 or 16 point Arial" styles and converts then to the "Heading 1" named style.

In one embodiment, a new named style is created for each logical style group. This can be done, for example, by averaging the styles in the style group and using the most common style as the basis for the new named style. In this way, the document is not required to include a pre-existing set of named styles in order to benefit from this invention.

In one embodiment, a user interface is provided to allow the user to confirm or override the style grouping. For example, after the document has been partitioned and style groups identified, a user can be prompted to increase or decrease the number of identified groups or to change the assignment of regions to groups. This allows the user to override the system's automatically-generated style mapping.

Systems and methods in accordance with the present invention simplify management of document formatting. Inconsistencies in style, for example where two regions look the same but are subtly different, are identified and corrected since these inconsistencies can cause problems in the future as the styles are modified. Common styles are inferred or applied to a given document automatically even though the styles in the document may have been applied individually in a manual fashion.

BRIEF DESCRIPTION OF THE DRAWINGS

FIG. 2 is a flow chart illustrating an embodiment of clustering regions of a given document using style vectors.

DETAILED DESCRIPTION

Figure 1:
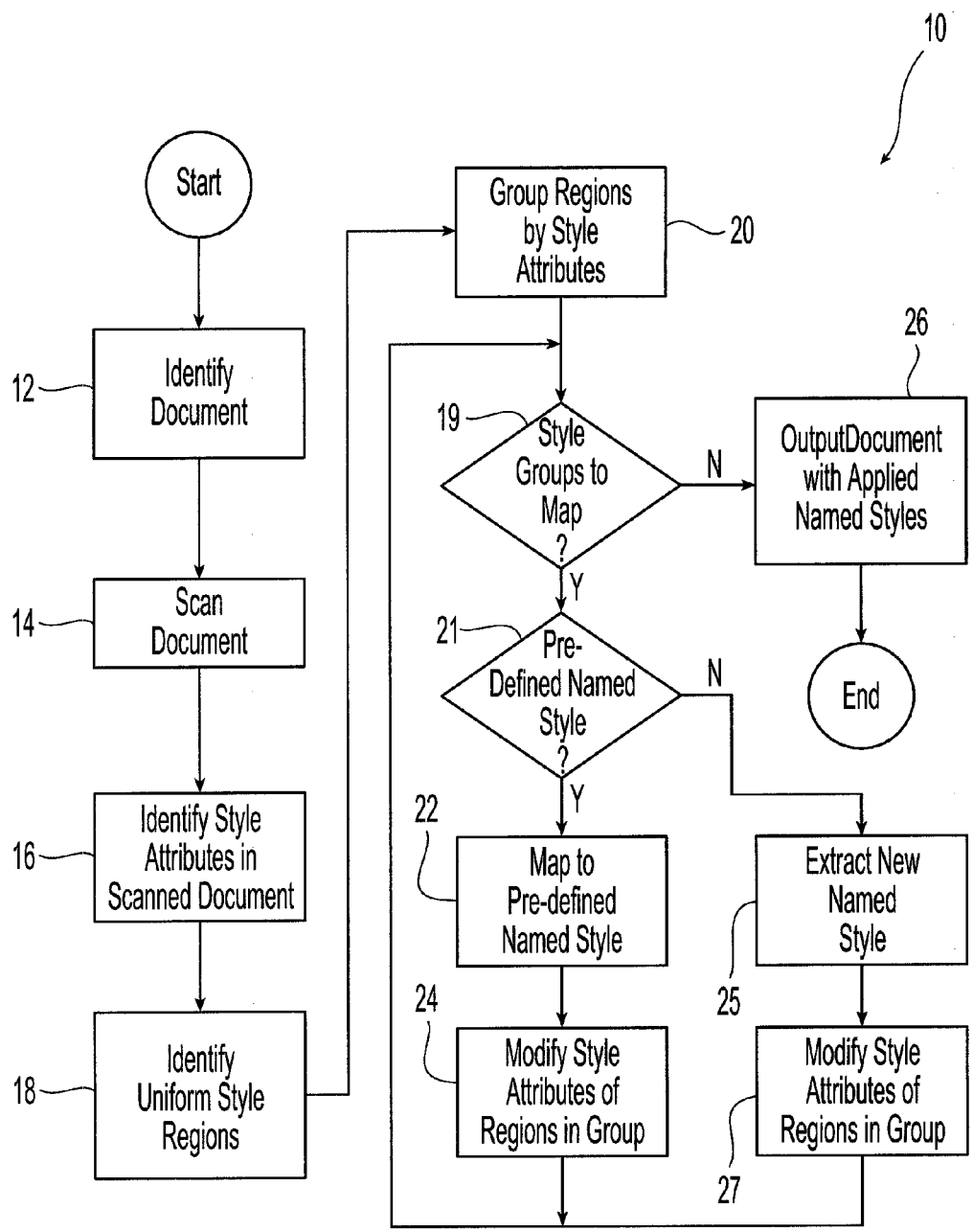
FIG. 1 is a flow chart illustrating one embodiment of a method for applying style sheets to word processing documents in accordance with the present invention.

Referring initially to FIG. 1, an exemplary embodiment of a method for automatically applying named styles to documents 10 in accordance with the present invention is illustrated. As used herein, a named style is a set of style attributes that are applied to the characters of a selected region of a document at the same time, for example through a graphical user interface. Each named style is assigned an abstract name, for example "Heading", "Body" or "Plain Text", that typically refers to the purpose of the named style rather than to the visual characteristics of the named style. A style attribute characterizes how the characters in a given document are formatted. Initially, an existing document that is to have style sheets applied to it is identified at step 12. Suitable documents include word processing documents, spreadsheet documents, presentation documents and any other document containing editable text including text that can be edited using a rich text editor. Style partitioning is then initiated on the identified document. The document is scanned at step 14. Although multiple scanning passes can be performed, the document is preferably scanned in a single pass.

The scanned text within the document has associated style attributes. These style attributes include, but are not limited to, font type, font size, font style, font face, font family, line spacing, letter spacing, paragraph alignments and other characteristics of the styling of text. In one embodiment, one or more style attributes associated with the scanned text is identified at step 16. In one embodiment, each style attribute is treated or weighted equally, and the scanned text is identified by all of the identified style attributes. These identified style attributes, however, can vary from section of text to section of text throughout the scanned document. Alternatively, the style attributes are not weighted equally. In one embodiment, the style attributes are given different weights. In one embodiment, a given section of text is identified using only a subset of the style attributes associated with the text. For example, style attributes such as font type and font size can be primary style attributes, and style attributes such as font style, superscript and subscript can be secondary style attributes. In one embodiment, sections of scanned text are only identified based upon primary style attributes. This embodiment would not define text based upon style attributes such as italics, superscript, subscript or strikethrough, and these style attributes would remain unchanged upon any subsequent modification or homogenization of the text. This embodiment accounts for single italicized words in a line of text and other similar style anomalies. Alternatively, both primary and secondary style attributes are associated with and used to define a given section of text. The weight to be given to the various style attributes is determined later in the process and can involve user input.

Having scanned the document and identified the style attributes throughout the scanned text, these identified style attributes are used to identify style regions at step 18. As used herein, style regions refer to sections or regions of text, tables and graphics within the document that contain consistent or substantially uniform styling. In identifying style regions, style consistency is applied internally to the style region itself, i.e., the style of a given style region is internally consistent. In one embodiment, a style region represents continuous or contiguous text. For example, a style region is identified that correlates to a heading within the document. Alternatively, one or more continuous paragraphs of text where all of the text within those paragraphs has a consistent style are identified as a style region. Style regions can be multiple paragraphs or pages of text or can be a single line of text, a single sentence, a single word or a single letter. The identification of style regions produces at least one and potentially a plurality of distinct identified style regions for a given document.

In one embodiment, identification of uniform style regions includes identifying a set of style attributes for each identified style region. Each set of style attributes includes at least one and preferably of plurality of style attributes of the style region with which it is associated. In one embodiment, this set of style attributes takes the form of an attribute style vector. Referring to FIG. 2, in accordance with one embodiment for identifying and associating style attributes with the identified style regions, after each distinct style region is identified, an attribute vector is created or extracted from each identified region of the document at step 28. Each style attribute vector includes all of the desired or identifiable style attributes associated with a given style region and, therefore, represents the overall style of the style region from which it is extracted. In one embodiment, the style attribute vector includes, but is not limited to, entries or values for font face, font family, font size, font stylings such as bold or italics, line spacing and paragraph alignments. These entries can be in the form of numerical values, names or binary values such as true and false, hi and lo and yes and no values. An example attribute vector for one identified style region is <font name: Times, font family: Serif, font size: 12 point, italic: No, boldface: Yes, line spacing: 1.0, paragraph alignment: left justified>.

Returning to FIG. 1, having identified style attributes and uniformly styled text regions within the document, style groups are identified at step 20, that is identified style regions of the document are clustered, i.e. grouped, together. Therefore, each style region within an identified style group is selected based upon a correspondence between the style attributes associated with that style region and the style attributes associated with the other style regions in the style group. In one embodiment, correspondence between the style attributes is obtained when all of the associated style attributes of each style region within the style group are identical. Alternatively, correspondence is achieved when all style attributes in a pre-determined subset of associated style attributes, e.g., the associated primary style attributes, of each region are identical. In this embodiment, associated style attributes not in the predetermined subset, e.g., the associated secondary style attributes, may or may not be identical.

In one embodiment, correspondence among the style attributes of each identified style region in a given style group is achieved when the associated style attributes of each style region within the style group are substantially identical as opposed to being exactly identical. In one embodiment, a content-based matching approach is used to establish correspondence among style regions that are substantially identical. The content-based approach analyzes the actual content of the text or characters in each identified style region. Therefore, each region with the content "Chapter" followed by an alpha-numeric indicator would be substantially identical. Alternatively, a style-based matching approach is used to establish correspondence among style regions that are substantially identical. The style-based matching approach utilizes either acceptable variances in the value of a given style attribute or a set of acceptable values for a given style attribute for one or more of the style attributes. For example, the style attribute font type is represented by the set containing the values "Times" and "Times New Roman", and the style attribute font size includes the font sizes within 2 points of each other. Therefore, style regions having an associated font type either Times or Times New Roman and a font size in the range from 10 point to 12 point are included in the group of substantially identical style regions based upon a style-based approach.

Referring again to FIG. 2, in one embodiment, identification of style groups from the style regions includes using the set of attributes associated with each identified style region. The values of each member of the attribute set of a first style region are compared to the corresponding values of each member of the attribute set of a second style region. If all of the compared members match or substantially match, then the first and second style regions can be grouped together. In one embodiment, the attribute sets are attribute vectors, and identification of style groups having identical or substantially identical style attributes includes identifying style attribute vectors that are identical or substantially identical and grouping these style attribute vectors together at step 30. In one embodiment, grouping of the style attribute vectors includes clustering. One suitable method for clustering the vectors is the K-means algorithm, which clusters objects based on attributes into k partitions. The K-means algorithm is described, for example, in J. B. MacQueen, "Some Methods for Classification and Analysis of Multivariate Observations, Proceedings of the 5th Berkeley Symposium on Mathematical Statistics and Probability", Berkeley, University of California Press, 1:281-297 (1967). Another suitable clustering algorithm is the HAC algorithm as described in S. C. Johnson, "Hierarchical Clustering Schemes", Psychometrika, 2:241-254 (1967). Typical clustering algorithms take as input a set of feature vectors, such as the ones generated for the identified regions, a similarity function and a target number of clusters. The input vectors are grouped into a number of clusters whose members are all similar to each other according to the similarity function. Suitable similarity functions include the standard cosine metric used in most clustering applications. In one embodiment, the number of clusters or groups is specified by the user. For example, the user can drag a slider dynamically to specify the number of clusters, and the resulting document is displayed in real-time in the word processor application. By comparing the feature vectors of regions, the visual similarity of two document regions can be compared.

Returning to FIG. 1, following the creation of style groups, uniform stylings for each group are either identified or created. This process is repeated iteratively until uniform style attributes have been applied to all of the style groups. Initially, a determination is made of whether or not a style group in need of style mapping and modification exists at step 19. If a style group exists that is in need of style mapping and modification, then a set of pre-defined style attribute sets or style attribute vectors, i.e. pre-defined named styles, is checked for applicability to the style group at step 21. If a suitable pre-defined named style exists, the style group is mapped to the pre-defined named style at step 22. Each pre-defined named style contains a pre-defined set of style attributes. In one embodiment, mapping of the style group is based on one or more of the style attributes associated with the style regions contained in the style group and one or more of the pre-defined style attributes of a given pre-defined named style. In one embodiment, mapping of style groups to pre-defined named styles is based upon primary style attributes, secondary style attributes or both primary and secondary style attributes. In one embodiment, mapping a style group to, a given pre-defined named style is accomplished using an identical match or a substantially identical match between the style attributes of the style regions contained within the style group and each one of the pre-defined style attributes of the pre-defined named style. Therefore, subsequent changes to the pre-defined style attributes within a given pre-defined named style will affect the style attributes of all of the style regions contained with the style group that has been mapped to that pre-defined style sheet.

Referring to FIG. 2, in one embodiment, the step of mapping each identified style group to a pre-defined named style includes associating a pre-defined style sheet with each extracted style attribute vector in a given cluster of style attribute vectors. Each pre-defined named style is expressed as a pre-defined style attribute vector having pre-defined values for each style attribute within the vector. Association between extracted vectors and pre-defined vectors is accomplished using an identical match or substantially identical match among the style attribute values in each vector for either all of the attribute values or a subset of the attribute values. In one embodiment, named styles and the style attribute vectors associated with the named styles are determined empirically. In one embodiment, a given style attribute vector is generated by averaging across all the attribute vectors of the style regions contained in a given cluster of style characteristic vectors at step 32, i.e. a given style group. Suitable methods for averaging values across all of the vectors in a given cluster include taking the most common value of a given characteristic for string-valued attributes and using the mathematical average of an attribute for real-number-valued attributes.

As shown in FIG. 1, having mapped a style group to a pre-defined named style, in one embodiment, at least some of the style attributes of one or more of the style regions contained within the style group are modified to be identical at step 24 with the pre-defined style attributes of the named style. In one embodiment, all of the style attributes associated with the style regions within a given style group that correspond to style attributes within the pre-defined named style are modified to be consistent with or identical to the style attributes within the pre-defined named style. Therefore, the attributes of the various style regions of the document are modified or "cleaned-up" to eliminate anomalies and artifacts of document mergers and manual or adhoc formatting.

As illustrated in FIG. 2, in one embodiment, having clustered the attribute vectors and identified the representative vector for each cluster, the step of modifying or cleaning-up the style attributes of each style region within a given style group includes modifying the associated style attribute vectors for these style regions to be identical to the representative vector for that cluster at step 34. Thus the actual attributes of each style region are changed to be consistent for all style regions contained within a given style grouping. As was described above, the style attribute vectors can be modified in whole or in part. In addition, modification can be conducted automatically or with manual user input to confirm modifications of certain characteristics of a given vector.

Returning to FIG. 1, if a corresponding pre-defined named style does not exist for the style group, a new named style is created or extracted from the style attributes of the style regions within the style group at step 25. In one embodiment, the style attribute sets associated with the style regions contained in the style group are combined to generate a named style sheet for each style group including common style groups. Again, the style attributes associated with each style region within each style group are modified to be identical to the style attributes of the new named style generated from each style group at step 27. Therefore, named styles are applied uniformly and consistently across various documents.

In one embodiment, the style attributes of mapped regions, whether mapped individually or in groups, are modified in accordance with the style attributes of the pre-defined style sheets such that certain style attributes are not changed. For example, only primary style attributes are changed and not secondary style attributes. Therefore, highlights in the text such as small groups of words or phrases that are highlighted, italicized or underlined are not removed through the modification process. In one embodiment this is accomplished automatically through the definition or parameters established with the modification process. In one embodiment, these anomalous stylings within a region are handled manually by utilizing user input. For example, during the process of modification, the user can be prompted to confirm, ignore or determine the action to take with regards to an anomalous section of text within a given region. Suitable types of user interfaces include, for example, the type of user input that is provided in spelling and grammar check routines used in word processing programs. In addition, user input can be provided to affirm the groupings of style regions or the application of style attributes to a given style group. User input can be user initiated or can be in response to a prompt from the system. In addition, user input can be provided to clarify questions or close calls in identifying regions, characteristics and styles.

Referring to FIG. 1, the resulting "cleaned" document is then output at step 26. Subsequent modifications to any of the style attributes of the document can be accomplished by changing the characteristics of the style sheets that have been associated with the document. If adhoc styles continue to be used, the document may be "cleaned up" again by reapplying the methods in accordance with the present invention.

In one embodiment, exemplary methods in accordance with the present invention are used to apply named styles to a plurality of documents. Therefore documents that have been prepared by different users or by different programs, i.e. word processing programs and presentation programs, can have common named styles applied to all of the documents. This common or universal style formatting is useful when the various documents are combined, for example, for a common presentation, publication or archiving. The common named styles can be extracted from the existing style attributes of the various documents or can be provided through mapping to pre-defined named styles. In one embodiment, the plurality of documents is scanned, either in serially or in parallel, and one or more style regions are identified within each one of the plurality of documents. As with the single document, preferably a single scanning pass is made. The scanning and identification techniques are the same as for the single document embodiment; however, style regions are identified simultaneously in all of the scanned documents. The style regions, while coming from different documents, are treated together for purposes of grouping and mapping. Each style region represents a section of text having uniform style attributes, one or more style attributes associated with each identified style region are identified.

The identified style attributes are used to group the identified style regions of each document into one or more style groups. The style groups represent groups of style regions having similar style attributes even though the actual regions may be associated with different documents. Therefore, a given style group can span two or more documents. In addition, style groups can exist that contain style regions associated with only a single document in the plurality of documents. In one embodiment, style groups common to two or more documents from the identified style groups can be identified. In one embodiment, each style group, including style groups related to a single document and style groups covering style regions of two or more documents are mapped to one of a plurality of pre-defined named styles. Each named style contains a plurality of pre-defined style attributes. Having mapped the style groups to named styles, style attributes associated with each style region associated with a given style group including style groups common to two or more documents are modified to be identical to the pre-defined style attributes of the named style to which the style group has been mapped.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for applying named styles to documents in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A system for applying named styles to a plurality of documents, the system comprising:
   a processor configured to perform the steps comprising:
      scanning each one of a plurality of documents in its entirety at the single character level, each document comprising a plurality of characters;
      an identification module identifying all style attributes associated with each individual character in each scanned document;
      identifying within each one of the plurality of documents one or more style regions, each style region comprising groupings of individual characters having uniform style attributes;
      identifying one or more of the style attributes associated with each identified style region;
      creating an attribute vector for each identified style region, each attribute vector comprising a type and a value for all identified style attributes for the associated identified style region; and
      using the attribute vectors to group the identified regions from all documents together into one or more style groups having similar style attributes, the style groups comprising:
         style groups comprising style regions derived from a single document; and
         style groups comprising style regions derived from two or more documents;
      averaging the style attributes associated with the style regions contained in each style group to generate a named style sheet for each style group; and
      modifying style attributes associated with each style region within each style group to be identical to the style attributes of the named style generated from each style group.

2. The system of claim 1, wherein the style attributes comprise font type, font size, font style, font face, font family, line spacing, letter spacing or paragraph alignments.

3. The system of claim 1, further comprising mapping each style group to one of a plurality of pre-defined named styles, each named style comprising a plurality of pre-defined style attributes.

4. The system of claim 3, wherein the step of mapping each style group further comprises at least one of matching a subset of the pre-defined style attributes of a named style to a subset of the style attributes of a given style group, matching a subset of the pre-defined style attributes of a given named style to all the style attributes of a given style group, matching all the pre-defined style attributes of a given named style to a subset of the style attributes of a given style group and matching all the pre-defined style attributes of a given named style to all the style attributes of a given style group.

5. The system of claim 3, wherein the step of mapping each identified style group further comprises establishing an exact match between the pre-defined style attributes of a given pre-defined named style and the style attributes of a given style group.

6. The system of claim 3, further comprising modifying style attributes associated with each style region within a given style group to be identical to the pre-defined style attributes of the named style to which the given style group has been mapped.

7. The system of claim 3, wherein the step of mapping each identified style group further comprises matching style attributes common to all style regions within a given style group to the pre-defined style attributes associated with the named style.

8. The system of claim 1, wherein the step of using the attribute vectors to group the style regions further comprises using automated clustering algorithms to group the attribute vectors and the associated style regions into one or more style groups by identifying a similarity function and grouping attribute vectors having members that are similar to each other in accordance with the similarity function.

9. The system of claim 1, wherein the step of using the attribute vectors to group the style regions further comprises matching style attributes in the attribute vectors using content-based matching, style-based matching or combinations thereof.

10. The system of claim 1, wherein:
   the step of identifying style attributes associated with each identified region further comprises identifying a style attribute set for each identified region, each style attribute set comprising at least one style attribute associated with a given style region; and the step of using the identified attributes to group the style regions further comprises matching style attribute sets.

11. The system of claim 10, further comprising:
   associating each one of a plurality of pre-defined named styles with a pre-defined style attribute set, each pre-defined style attribute set comprising at least one pre-defined style attribute; and
   matching style attribute sets associated with style regions in a given style group with pre-defined style attribute sets associated with the pre-defined named styles.

12. The system of claim 10, wherein averaging the style attributes further comprises averaging the style attribute sets associated with the style regions contained in a given style group to generate a named style sheet for the given style group.

13. The system of claim 12, wherein the step of averaging the style attribute sets further comprises identifying a most common value of a given attribute for string-valued attributes, using a mathematical average of an attribute for real-number-valued attributes or combinations thereof.

14. A method for applying named styles to a plurality of documents, the method comprising:
    scanning each one of a plurality of documents in its entirety at the single character level, each document comprising a plurality of characters;
    identifying all style attributes associated with each individual character in each scanned document;
    identifying within each one of the plurality of documents one or more style regions, each style region comprising groupings of individual characters having uniform style attributes;
    identifying one or more of the style attributes associated with each identified style region;
    creating an attribute vector for each identified style region, each attribute vector comprising a type and a value for all identified style attributes for the associated identified style region; and
    using the attribute vectors to group the identified regions from all documents together into one or more style groups having similar style attributes, the style groups comprising:
        style groups comprising style regions derived from a single document; and
        style groups comprising style regions derived from two or more documents;
    averaging the style attributes associated with the style regions contained in each style group to generate a named style sheet for each style group; and
    modifying style attributes associated with each style region within each style group to be identical to the style attributes of the named style generated from each style group.

15. The method of claim 14, further comprising mapping each style group to one of a plurality of pre-defined named styles, each named style comprising a plurality of pre-defined style attributes.

16. The method of claim 15, further comprising modifying style attributes associated with each style region associated with a given style group to be identical to the pre-defined style attributes of the named style to which the style group has been mapped.

17. A non-transitory computer-readable medium containing a computer-readable code that when read by a computer causes the computer to perform a method for applying named styles to a plurality of documents, the method comprising:
    scanning each one of a plurality of documents in its entirety at the single character level, each document comprising a plurality of characters;
    identifying all style attributes associated with each individual character in each scanned document;
    identifying within each one of the plurality of documents one or more style regions, each style region comprising groupings of individual characters having uniform style attributes;
    identifying one or more of the style attributes associated with each identified style region;
    creating an attribute vector for each identified style region, each attribute vector comprising a type and a value for all identified style attributes for the associated identified style region; and
    using the attribute vectors to group the identified regions from all documents together into one or more style groups having similar style attributes, the style groups comprising:
        style groups comprising style regions derived from a single document; and
        style groups comprising style regions derived from two or more documents;
    averaging the style attributes associated with the style regions contained in each style group to generate a named style sheet for each style group; and
    modifying style attributes associated with each style region within each style group to be identical to the style attributes of the named style generated from each style group.

* * * * *